3,647,735
PIGMENTED FINISHES FOR FIBROUS ARTICLES
John G. Brodnyan, Langhorne, Pa., assignor to Rohm and
Haas Company, Philadelphia, Pa.
No Drawing. Filed Jan. 29, 1970, Ser. No. 6,919
Int. Cl. C08f 39/00
U.S. Cl. 260—29.4 UA     3 Claims

ABSTRACT OF THE DISCLOSURE

The present invention concerns pigment-finishing, i.e. pigment-dyeing or pigment-printing of fibrous materials, such as textile fabrics of all kinds including those formed of siliceous fibers. The pigment-binding composition of the present invention comprises a mixture of a relatively soft linear addition polymer and a relatively hard addition polymer. The pigmented finishes show improved crock-fastness and abrasion-resistance.

DESCRIPTION OF THE INVENTION

It has heretofore been suggested for the binding of pigments in the pigment-dyeing and pigment-printing of textiles to use various linear polymers containing N-methylol or N-($C_1$–$C_4$)-alkoxy methyl substitutents. In U.S. Pats. 3,033,811 and 3,446,777 there is mentioned the use of such copolymers for the binding of pigments in the finishing of textiles. However, it has been found that while such binders give good adhesion and can be cured to overcome any residual tackiness, when soft varieties of the polymers are employed, the finished products are deficient in abrasion-resistance and crock-resistance. Some improvement can be obtained in the latter properties when these linear polymers are used in compositions which also comprise cross-linking agents such as aminoplasts including those of the melamine-formaldehyde variety. However, when such aminoplasts are employed there is an undesirable tendency for the finished fibrous articles to be stiffened and to develop a poor hand. These addition polymer compositions whether or not they contain an aminoplast cross-linker generally have poor adhesion to such difficult substrates as fabrics formed of siliceous fibers such as glass fiber yarns. In accordance with the present invention, it has been found that improved crock-resistance and abrasion-resistance are obtainable even on such difficult substrates as fabrics of glass fiber or other siliceous fiber yarns when there is used as the pigment binder a composition comprising a blend of two types of water-insoluble linear addition polymers.

The first (sometimes referred to hereinafter as component (1)) of the two types of addition polymers is a copolymer in the form of an aqueous dispersion made by emulsion polymerization of about 0.5 to 5.0% of monomeric amide or alkenyl-guanamine monomers in which the nitrogen of the amide or of one or both of the amino groups in the alkenylguanamine is substituted by a methylol or a ($C_1$–$C_4$)-alkoxy methyl group. The group of nitrogen-containing monomers from which the component (1) of the binder composition is made includes the methylol and alkoxymethyl derivatives of various alpha,beta-monoethylenically unsaturated acids such as acrylamide, methacrylamide, maleamide, maleamic acid, itaconmic acid, fumaramide and the like. In addition, the nitrogen-containing monomers whose N-methylol and/or N-alkoxymethyl derivatives may be employed include those of the formula

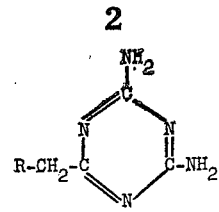

wherein R is an alkenyl group having 3 to 9 carbon atoms and a terminal group $H_2C=C<$. In other terms, the group R is an alkenyl group of the formula —$C_nH_{2n-1}$ in which $n$ has a value of 3 to 9, which alkenyl group has a terminal group $H_2C=C<$, and also the alkenyl guanamines disclosed in U.S. Pats. 2,461,943, 2,689,238 and 2,726,229. Of the alkenyl guanamines, those disclosed in U.S. 3,446,777 and which have the formula given hereinabove are preferred. The N-methylol and/or N-alkoxymethyl derivatives are copolymerized with at least one ($C_2$–$C_8$)-alkyl acrylate, such as ethyl acrylate, n-propyl acrylate, isopropyl acrylate, n-butyl acrylate, isobutyl acrylate, tert-butyl acrylate, n-hexyl acrylate, 2-ethylbutyl acrylate, or 2-ethylhexyl acrylate. The polymer may be a copolymer of the N-substituted amide and/or alkenyl-guanamine with at least one ($C_2$–$C_8$)-alkyl acrylate with one or more other monomers which if polymerized without the acrylate would produce a polymer which would not form a film at room temperature. The latter monomers may be referred to as hard monomers whereas the former (i.e. the ($C_2$–$C_8$)-alkyl acrylates) may be referred to as soft monomers. Thus, such copolymers may contain up to about 35% by weight, based on the entire copolymer weight, of one or more hard monomers, such as methyl acrylate, methyl methacrylate, acrylonitrile, styrene, vinyl-toluene (o-, m-, or p-), vinyl acetate, vinyl chloride, and/or vinylidene chloride, provided that the resulting copolymer has a minimum film-forming temperature (MFT) that is not above room temperature, i.e. not above about 20° C. The apparent second order transition temperature as indicated by the torsional modulus $T_i$ (as defined hereinafter) of the polymer used as the first component of the binder should not be above about 25° C. and may be from —50° C. to 25° C. The MFT is that temperature at which or above which a continuous film is produced upon the drying of an aqueous dispersion or latex containing the polymer whose MFT is referred to.

The $T_i$ value referred to herein is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.²

The second component (sometimes hereinafter referred to as component (2)) is an aqueous dispersion of an emulsion polymer having an MFT of about 50° C. or higher or a $T_i$ of about 50° C. up to about 120° C. Both dispersions are of such character that they can be mixed together to form what is sometimes herein referred to as a "polyblend" without effecting coagulation. In other words, they have similar ionic character. For example, both may be made with an anionic emulsifier or both may be made with nonionic emulsifiers or with a mixture of anionic and nonionic emulsifiers. Similarly, both may be made with cationic emulsifiers or with mixtures of cationic emulsifiers and nonionic emulsifiers. In general, if one is made with an anionic emulsifier, the other may be made with either a nonionic or an anionic emulsifier but is generally restricted as to any content of cationic emulsifier. A small amount of a cationic emulsifier may be present but it is preferred that if it is present when the other polymer dispersion contains an anionic emulsifier, there should be sufficient nonionic emulsifier in one or both of the systems to prevent the cationic and the anionic emulsifiers from coagulating the system.

The other component (i.e. component (2)) is an aqueous dispersion of a polymer made by emulsion polymerization, the polymer being either a homopolymer or a copolymer of one or more monoethylenically unsaturated compounds having the group $H_2C=C<$, the monomer or monomers employed in making the polymer being such as to provide in the product an MFT of at least 50° C. Thus, for this purpose, the second polymer may be polyvinyl chloride, polymethyl methacrylate, polystyrene, polyvinyl toluene, polyacrylonitrile or copolymers of any one of these monomers with each other or with other monoethylenically unsaturated monomers such as a vinyl ester of a $C_1$-$C_{18}$) alkanoic acid including vinyl acetate, vinyl butyrate, vinyl laurate, and vinyl stearate; one or more esters of acrylic acid or methacrylic acid with an alcohol having 1 to 18 carbon atoms such as methyl acrylate or methacrylate, ethyl acrylate or methacrylate, 2-ethylhexyl acrylate or methacrylate, lauryl acrylate or methacrylate, cyclohexyl acrylate or methacrylate, isobornyl acrylate or methacrylate, and stearyl acrylate or methacrylate, vinylidene chloride, diesters of a ($C_1$-$C_8$) alkanol with a dicarboxylic acid such as fumaric acid, maleic acid, citraconic acid, and itaconic acid. The proportion of any monomer which when homopolymerized yields a polymer having an MFT below 50° C., should be predetermined to assure that the copolymer produced as component (2) herein has an MFT of at least about 50° C. The upper limit of MFT is not critical and may be anywhere from 60 to 150° C. The $T_i$ of this component may be about 50° C. and up.

The molecular weight of the two polymeric components may be that which is typical of emulsion polymers, in general from about 500,000 to several million, e.g., ten million viscosity average, and preferably the molecular weight of each is at least about 900,000.

The two polymer dispersions are ordinarily separately prepared and then mixed. However, the two polymers may in some instances be sequentially polymerized in a single container.

In making up the pigmented compositions of the present invention, component (1) constitutes from 50–90% by weight solids of the mixture of components (1) and (2) and preferably the polyblend is a mixture containing 65–90% by weight of component (1) and 35–10% by weight respectively of component (2).

The dispersions of component (1) (low MFT polymer) and of the high MFT polymer constituting component (2) may be made by any of the known emulsion copolymerization procedures, e.g. by first mixing the several monomers in the desired proportions into an aqueous solution of an anionic, a cationic, or preferably a nonionic, dispersing or emulsifying agent.

Examples of anionic emulsifying agents that may be used include the higher fatty alcohol sulfates, such as sodium lauryl sulfate, the alkylaryl sulfonates, such as sodium t-octylphenyl sulfonates, the sodium di-octyl sulfosuccinates and so on. Examples of cationic emulsifiers include trimethyl(dodecylbenzyl)ammonium chloride, and octadecylpyrridinium chloride. Examples of the nonionic dispersing agents that may be used for preparing the monomeric emulsions before copolymerization or dispersions of the polymer after polymerization include the following: alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxy ethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups to 6 to 15 carbon atoms; ethylene oxide derivatives of long-chained carboxylic acids, such as lauric, myristic, palmitic, oleic, and the like or mixtures of acids such as are found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymer of ethylene oxide and propylene oxide comprising a hydrophobic propylene oxide section combined with one or more hydrophilic ethylene oxide sections.

For the copolymerization, peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "persalts" such as the alkali metal and ammonium persulfates and perborates, hydrogen peroxide, organic hydroperoxides such as tert-butyl hydroperoxide, and cumene hydroperoxide, and esters such as tert-butyl perbenzoate. Other reducing agents include water-soluble thiosulfates and hydrosulfites. Activators or promoters in the form of the salts—such as the sulfates or chlorides—of metals which are capable of existing in more than one valence state such as cobalt, iron, nickel, and copper may be used in small amounts. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0% based on the weight of the monomers, of the peroxidic agent and the same or lower proportions of the reducing agent are recommended. In this way it is possible to prepare dispersions which contain as little as 1% and as much as 60% or 70% of the resinous copolymer on a weight basis. It is, however, more practical—hence preferred—to produce dispersions which contain about 30% to 50% resin solids. The fibers in the yarns from which the textile fabrics are made may be cellulosic, such as cotton, linen, rayon, or cellulose esters such as cellulose acetate or cellulose acetate butyrate. They may be of wool, casein, alpha-protein, nylon, polyesters, such as polyethylene glycol terephthalate, or of addition polymers, such as polyacrylonitrile or copolymers of acrylonitrile with ethyl acrylate, methyl acrylate and other monomers, copolymers of vinyl chloride or vinylidene chloride with vinyl acetate, acrylonitrile, or acrylic esters, silk, asbestos, glass or mineral wool or fibers of metal such as aluminum.

The pigment finishing compositions compise 4–15% by weight of solids of the polyblend, ½ to 10% by weight of a pigment for coloring or delustering which, for example, may include ½–4% by weight of an organic pigment for coloring and/or ½ to 6% of an inorganic pigment for coloring or delustering, 0–50% by weight, based on polymer solids, of a plasticizer, the percentages being based on the entire composition except where specifically noted otherwise, 0–1% by weight of a coupling agent, 0–1% by weight, based on the weight of pigment or delustrant, of a dispersing agent for the latter.

Besides the components just mentioned, there may be included a water-soluble thickening agent, such as gum tragacanth, water-soluble cellulose ethers, polyvinyl alcohol or partially saponified polyvinyl acetate, or copolymers of 30–60% of acrylic or methacrylic acid with 70–40% of ethyl or methyl acrylate. The aqueous dispersions may contain a mild alkali, for example, sodium acetate, sodium carbonate, chalk, morpholine, N-methyl-morpholine, triethylamine, or ammonia, including, if desired, a mixture of water-soluble substances which form a conventional, mildly alkaline buffer. The proportions of the several ingredients in the aqueous dispersions can be varied widely, and they are adjusted in any convenient manner so that the dispersions or pastes have a consistency suitable for application by the particular technique to be employed for this purpose.

While a plasticizer is not generally necessary for the preferred polyblends, the incorporation of a plasticizer may be desirable in some instances, such as when component (2) has an MFT in the upper portion of the range mentioned previously and the MFT of component (1) is in the upper portion of its range. Plasticizer is also useful when component (2) is used in proportion within the upper portion of the range specified. In such instances, the plasticizer serves as a coalescent and improves the binding action and assures good film formation at ambient temperatures that might be somewhat below 20° C. They also aid flow and leveling of the pigment-printing compositions.

Since the purpose of the plasticizer is usually to facilitate film formation, and since it is not always necessary to impart flexibility to the polyblend when it is inherently tough and flexible, as is often the case, a fugitive or semi-fugitive plasticizer may sometimes be preferred rather than a permanent plasticizer. However, permanent plasticizers may be used without the production of films having poor wear-resistance and poor resistance to water since the proportion of plasticizer introduced is in most cases relatively small, generally being not over about 30% by weight of the total copolymer solids. Mixtures of fugitive and permanent plasticizers may also be used.

Examples of fugitive plasticizers include the monoethyl or monomethyl ether of diethylene glycol, isophorone, benzyl alcohol, and 3-methoxybutanol-1. Examples of essentially permanent plasticizers that are suitable include benzyl butyl phthalate, dibutyl phthalate, dimethyl phthalate, triphenyl phosphate, 2-ethylhexyl benzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalylbutyl glycolate, acetyl tributyl citrate, dibenzyl sebacate, tricresyl phosphate, toluene ethyl sulfonamide, the di-2-ethylhexyl ester of hexamethylene glycol diphthalate, di(methylcyclohexyl)-phthalate, tributoxyethyl phosphate, tributyl phosphate. The particular plasticizer and the amount thereof used are chosen in accordance with the demand for compatibility and efficiency in lowering the film-forming temperature.

When the fibrous material to be printed or finished with the pigmented compositions of the present invention is formed of siliceous fibers, i.e., glass fibers or siliceous mineral fibers, it is desirable to include within the compositions a coupling agent which serves to aid in adhering the pigmented composition to the siliceous substrate. The coupling agents that are suitable are organofunctional silanes which include:

(a) An (epoxycycloalkyl)alkyltrialkoxysilane such as beta-(3,4-epoxycyclohexyl)ethyltrimethoxysilane,
beta-(3,4-epoxycyclohexyl)propyltriethoxysilane,
gamma-(3,4-epoxycyclohexyl)propyltriethoxysilane,
beta-(4,5-epoxycycloheptyl)ethyltrimethoxysilane,
beta-(2,3-epoxycyclohexyl)ethyltripropoxysilane,
delta-(2,3-epoxycycloheptyl)butyltripropoxysilane, and the like;

(b) A glycidoxyalkyltrialkoxysilane such as gamma-glycidoxypropyltrimethoxysilane,
gamma-glycidoxypropyltriethoxysilane,
beta-glycidoxyethyltributoxysilane,
delta-glycidoxybutyltriethoxysilane, and the like, (c) An (acryloxy)alkyltrialkoxysilane such as gamma-(methacryloxy)propyltrimethoxysilane,
gamma-(ethacryloxy)propyltrimethoxysilane,
gamma-(acryloxy)propyltriethoxysilane,
beta-(methacryloxy)ethyltriethoxysilane,
gamma,(methacryloxy)butyltripropoxysilane,
delta-(methacryloxy)butyltriethoxysilane, and the like.

(d) An aminoalkyltrialkoxysilane, such as gamma-aminopropyltrimethoxysilane,
gamma-aminopropyltriethoxysilane,
beta-aminoethyltrimethoxysilane,
N-(trimethoxysilylpropyl)-ethylene diamine;

(e) A haloalkyltrialkoxysilane, such as gamma-chloropropyl trimethoxysilane,
beta-chloroethyltrimethoxysilane, (f) A mercaptoalkyltrialkoxysilane, such as gamma-mercaptopropyltrimethoxysilane,
beta-mercaptopropyltrimethoxysilane, and (g) A vinyltrialkoxysilane, such as vinyltrimethoxysilane, and
vinyltriethoxysilane.

Since the pigmented compositions into which the silanes are incorporated are of aqueous character, the silane is possibly hydrolyzed so what is actually deposited in the finishing or printing process is a silane-derived hydrolyzate or a siloxane which may be chemically bonded to the glass surface, as theorized in Journal of Colloid and Interface Science, vol. 27, pp. 751–760. Thus when beta-(3,4-epoxycyclohexyl)ethyltrimethoxysilane is present in the composition, it is probably beta-3,4-epoxycyclohexyl ethyl siloxane in the finished product. It is to be understood, however, that applicants' claims are not to be limited by any theory of action.

The pigmented composition may be applied in various ways. For example, it may be applied simply by a textile pad in which event the viscosity or body is appropriately adjusted by the addition of a thickening agent if necessary or by dilution to facilitate the passage of the textile fabric through the composition. When the composition is to be applied to local areas as in pigment-printing, it may be suitably thickened and applied by means of rolls having its surface suitably recessed to provide elevated lands which receive the composition and transfer it to the textile fabrics which pass over the roll.

In general the application of a composition may be effected at any temperature from room temperature to 40° C. After application to provide a suitable depth of delustering or coloring which may require up to 20%, and preferably from 1 to 6%, by weight of dry composition, based on the weight of the finished fabric, the finished fabric is then dried and cured. Drying may be effected at room temperature up to 140° F. and the curing may be effected at any temperature from about 220 to 750° F. for a period of time which varies inversely with the intensity of temperature such as from about 10 seconds at the upper temperatures down to about ½ to one hour at the lower temperatures. The temperature to which the finished fabric is subjected for curing depends on the speed at which the fabric passes through the zone in which curing is effected by heat, the nature of the substrate and the nature of the composition.

Example 1

(A) A pigmented finish is prepared by mixing
(a) 7.5 parts of a 50% solids aqueous dispersion of a copolymer of about 96% of butyl acrylate, about 3.5% of N-methylol-4-pentenoguanamine, and about 0.5% of acrylic acid having a molecular weight of over one million viscosity average and an MFT less than 0° C. (The $T_i$ is about —47° C.)

(b) 2.5 parts of a 50% solids aqueous dispersion of a copolymer of vinyl acetate and vinyl chloride (25:75) having a molecular weight over one million viscosity average and an MFT of 50° C. ($T_i$ being about 55° C.)

(c) 5 parts of a 60% aqueous dispersion of lithopone, to serve as a delustrant, (d) 0.5 part of glycidoxypropyltrimethoxysilane to serve as a coupling agent, (e) 3.5 parts of a 62% aqueous dispersion of epoxidized soybean oil to serve as a plasticizer, (f) 3 parts of the phthalocyanine pigment available as Toluidine Red (Color Index No. 12,120), (g) about 78 parts water (to bring the total parts to 100), and (h) ammonia to raise the pH to 9.4.

(B) A fabric formed of glass fiber yarns is passed through the composition of part A in a textile pad, squeezing to a wet pick-up of 25%. The fabric is then passed through an oven at 190° C. for a period of one and one-half minutes. The resulting fabric shows good crock-resistance both dry and wet when tested by AATCC Test Method 8–1961.

Example 2

Example 1 is repeated changing the amounts of components (a) and (b) to those shown in the following table. The treated fabrics are subject to both dry crock and wet crock tests. All of these fabric sections have excellent crock resistance, both wet and dry, as compared to commercially used pigment finishes. However, Run 3 gives the best dry crock whereas Run 1 gives the best wet crock. Separate portions of the treated fabrics are subjected to ten home launderings, in an automatic home washer using a 12-minute wash cycle and 15 gallons of water at 40° C. containing ¼ cup of the commercially available detergent Tide (containing a sodium alkyl (3- to 4-carbon) benzene sulfonate and sodium polyphosphate), the fabrics being air-dried after each wash. The pigment retention is determined by measuring the reflectance on a Model 610 Photometer of Photovolt Corporation. The following table gives the retention values.

| Run | Parts of— a | Parts of— b | Pigment retention (percent) |
|---|---|---|---|
| 1 | 5 | 5 | 76.4 |
| 2 | 6 | 4 | 89.5 |
| 3 | 7 | 3 | 92.1 |
| 4 | 8 | 2 | 100 |
| 5 | 9 | 1 | 94.3 |

Example 3

Example 1 is repeated replacing 7.5 parts of (a) with 6.5 parts of a 50% solids aqueous dispersion of a copolymer of about 97% butyl acrylate and about 3% of a mixture of methacrylamide and N-methylolmethacrylamide in about equimolar proportions having a molecular weight of about 700,000 and an MFT of below 0° C. ($T_i$ about —47° C.) and replacing the 2.5 parts of (b) with 3.5 parts of a 50% aqueous dispersion of polyvinyl chloride having a molecular weight of about 2,000,000 viscosity average and an MFT of 50° C. ($T_i$ about 55° C.).

Example 4

(a) A clear emulsion is made by mixing on a homogenizer 35 parts of water, 60 parts of Varsol No. 1 (a naphtha containing 42% naphthenes, 43% paraffins, and 15% aromatics boiling in the range of 160–169° C.) and 5 parts of oxyethylated stearic acid (about 20 oxyethylene units).

(b) A pigment printing composition is made by mixing 66 parts of the clear emulsion obtained in part (a), 20 parts of a 47% solids aqueous dispersion of a copolymer of 96% ethyl acrylate, 3.5% N-methylol-4-pentenoguanamine and about 0.5% of acrylic acid, 10 parts of an aqueous pigment dispersion containing 30% by weight of phthalacyanine blue available commercially under the name Aqua Print Blue 2B (Color Index No. 74160/74250) and 4 parts of aqueous ammonium nitrate (25%). The resulting material is a paste of about 400 poises viscosity at 25° C.

(c) The procedure of part (b) is repeated replacing the 20 parts of the acrylic latex with various mixtures of such acrylic latex with a 48% solids 25 vinyl acetate/75 vinyl chloride copolymer latex. The relative proportions between the two latices are given in the following table:

| Run | Parts acrylic latex | Parts vinyl chloride polymer latex |
|---|---|---|
| 1 | 10 | 10 |
| 2 | 12 | 8 |
| 3 | 14 | 6 |
| 4 | 16 | 4 |
| 5 | 18 | 2 |

(d) Each of the mixtures of part (c) is screen-printed onto 80² cotton broadcloth weighing 4 oz./sq. yd. to provide about 17.5% by weight pick-up after drying, the add-on being therefore about 0.7 oz./sq. yd. A portion of the printed fabric is air-dried and another portion is air-dried and then heated at 150° C. for 3 minutes.

The resultig fabrics are then washed five times in an automatic home laundry machine using a 12-minute wash cycle and 15 gallons of water at 60° C. containing ¼ cup of the commercially available detergent, Tide, the fabrics being dried at 60° C. after each wash.

The resulting fabrics are then tested for pigment retention by measuring reflectance on the photometer mentioned hereinabove. The following table summarizes the results:

Pigment retention,
Run: percent
1 (Air-dried) _____ 32
1 (Air-dried and cured) _____ 91
2 (Air-dried) _____ 42
2 (Air-dried and cured) _____ 91
3 (Air-dried) _____ 89
3 (Air-dried and cured) _____ 92
4 (Air-dried) _____ 92
4 (Air-dried and cured) _____ 95
5 (Air-dried) _____ 91
5 (Air-dried and cured) _____ 93

Additional sections of the fabrics are tested for crocking, both dry and wet, by the AATCC Method 8–1969. All of these fabric sections have excellent crock resistance, both wet and dry, as compared to commercially used pigment finishes. However, Run 2 gives the best dry crock, both air-dried and cured and Run 5 gives the best wet crock, both air-dried and cured.

Example 5

Example 1 is repeated replacing the butyl acrylate copolymer with a corresponding amount of each of the following soft copolymers in the form of 47% solids latices:

(a) 67% ethyl acrylate, 30% methyl methacrylate, and 3% N-methylol acrylamide having a $T_i$ of about 10° C.

(b) 20% ethyl acrylate, 35% methyl methacrylate, 40% 2-ethylhexyl acrylate, 2.5% N-methylol-methacrylamide, and 2.5% acrylamide having a $T_i$ of about —4° C.

(c) 68% ethyl acrylate, 30% styrene, and 2% of N-methoxymethyl-4-pentenoguanamine having a $T_i$ of about 9° C.

(d) 68% ethyl acrylate, 20% acrylonitrile, 7% methyl methacrylate, and 5% N - ethoxymethyl - 10 - undecenoguanamine having a $T_i$ of about 8° C.

(e) 80% 2-ethylhexyl methacrylate, 15% methyl methacrylate, and 5% N-methylol-maleamic acid having a $T_i$ of about −37° C.

(f) 97% 2-ethylhexyl, acrylate and 3% of N-methylol-itaconamic acid having a $T_i$ of about −55° C.

(g) 96% butyl acrylate and 4% methylolated-maleamide having an average of 1.4 methylol groups per amide nitrogen in the maleamide units and having a $T_i$ of about −41° C. The treated fabrics obtained show improved crock resistance comparable to that of the fabrics in Example 1.

Example 6

Example 3 is repeated replacing the high MFT component with a corresponding amount of each of the following copolymers in the form of 48% solids latices:

(a) 10% ethyl acrylate, 89% methyl methacrylate and 1% itaconic acid having a $T_i$ of about 86° C.

(b) 35% ethyl acrylate and 65% methyl methacrylate having a $T_i$ of about 50° C.

(c) 35% ethyl acrylate, 64% methyl methacrylate and 1% N-methylol-acrylamide having a $T_i$ of about 50° C.

(d) 20% butyl acrylate, 30% vinyltoluene, and 50% ethyl methacrylate having a $T_i$ of about 60° C.

(e) 30% butyl methacrylate, 20% acrylonitrile, and 50% methyl methacrylate having a $T_i$ of about 75° C. and (f) 10% 2-ethylhexyl acrylate, 50% styrene, 15% vinylidene chloride, and 25% methyl methacrylate having a $T_i$ of about 53° C.

I claim:

1. A composition for the pigment-printing or pigment-dyeing of a fibrous material comprising an aqueous dispersion of
   (a) a water-insoluble linear addition copolymer, having an MFT of up to about 20° C., of a ($C_2$–$C_8$) alkyl acrylate, and about 0.5 to 5% by weight of an N-methylol- or N-($C_1$–$C_4$) alkoxymethyl-substituted ($C_3$–$C_{10}$) alkenyl-guanamine or such a substituted amide of an $\alpha$-$\beta$-unsaturated acid,
   (b) a water-insoluble addition polymer of one or more monoethylenically unsaturated compounds having the group $H_2C{=}C{<}$ having an MFT of at least about 50° C., and
   (c) a pigment and/or a delustrant, copolymer (a) constituting 50 to 90% by weight of the total of (a) and (b).

2. A composition as defined in claim 1 wherein the composition also contains a plasticizer for components (a) and/or (b).

3. A composition as defined in claim 1 wherein the composition also contains an organofunctional silane.

References Cited

UNITED STATES PATENTS

| 3,175,988 | 3/1965 | Berns | 260—29.6 |
| 3,245,938 | 4/1966 | Dennis | 260—29.6 |
| 3,356,627 | 12/1967 | Scott | 260—29.6 |
| 3,446,777 | 5/1969 | Emmons | 260—78.5 |

OTHER REFERENCES

Chem. Abstracts 67, 74405r (1967).
Chem. Abstracts 69, 28548h (1968).

WILLIAM H. SHORT, Primary Examiner
E. A. NIELSEN, Assistant Examiner

U.S. Cl. X.R.

117—126 GR, 138.8 A, 145, 161 UN, UC; 260—29.4 UA, 895, 901